March 24, 1964 E. G. W. FRESK ETAL 3,126,454
TELEPHONE INSTRUMENT
Filed Aug. 25, 1960 6 Sheets-Sheet 1
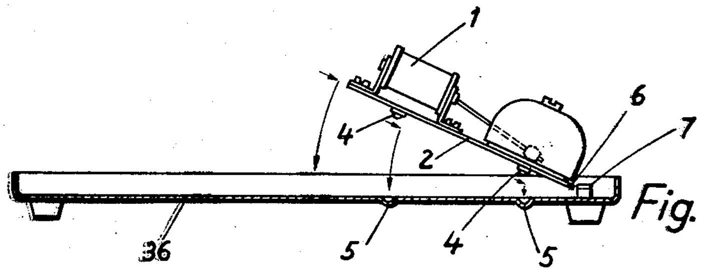
Fig. 1
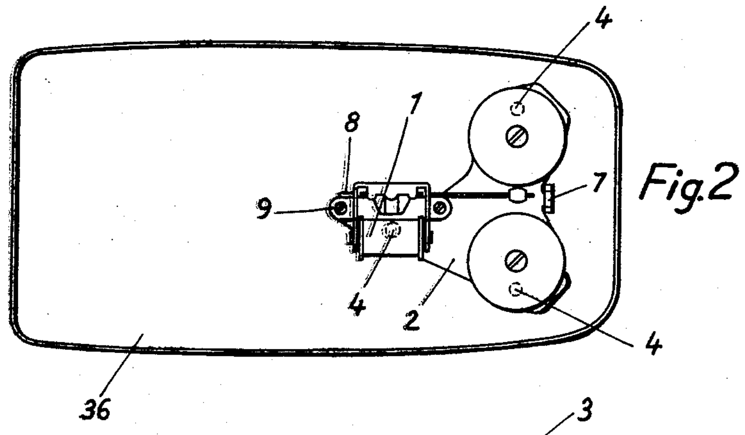
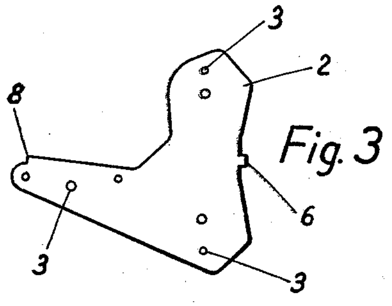
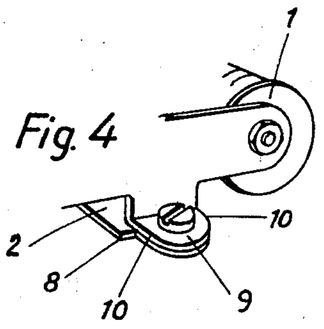
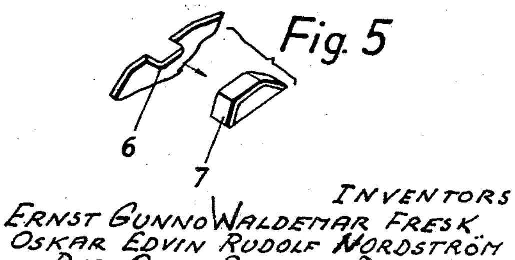
INVENTORS
ERNST GUNNO WALDEMAR FRESK
OSKAR EDVIN RUDOLF NORDSTRÖM
PER OLOF RAGNAR PERSSON
BY Hane and Nydick
ATTORNEYS INVENTORS
ERNST GUNNO WALDEMAR FRESK
OSKAR EDVIN RUDOLF NORDSTRÖM
PER OLOF RAGNAR PERSSON
BY Hane and Nydick
ATTORNEYS INVENTORS
ERNST GUNNO WALDEMAR FRESK
OSKAR EDVIN RUDOLF NORDSTRÖM
PER OLOF RAGNAR PERSSON
BY Hane and Nydick
ATTORNEYS March 24, 1964 E. G. W. FRESK ETAL 3,126,454

TELEPHONE INSTRUMENT

Filed Aug. 25, 1960 6 Sheets-Sheet 4

INVENTORS
ERNST GUNNO WALDEMAR FRESK
OSKAR EDVIN RUDOLF NORDSTRÖM
PER OLOF RAGNAR PERSSON
BY Hane and Nydick
ATTORNEYS INVENTORS
ERNST GUNNO WALDEMAR FRESK
OSKAR EDVIN RUDOLF NORDSTRÖM
PER OLOF RAGNAR PERSSON
BY Hane and Nydick
ATTORNEYS INVENTORS
ERNST GUNNO WALDEMAR FRESK
OSKAR EDVIN RUDOLF NORDSTRÖM
PER OLOF RAGNAR PERSSON
BY Hane and Nydick
ATTORNEYS 3,126,454

TELEPHONE INSTRUMENT

Ernst Gunno Waldemar Fresk, Stockholm, Oskar Edvin Rudolf Nordström, Hagersten, and Per Olof Ragnar Persson, Sundbyberg, Sweden, assignors to Telefonaktiebolaget L M Ericsson, Stockholm, Sweden, a corporation of Sweden Filed Aug. 25, 1960, Ser. No. 51,979
Claims priority, application Sweden Aug. 31, 1959
9 Claims. (Cl. 179—100)

The invention refers to telephone instruments and is intended to make such a construction of the instruments possible that mounting, adjustment and repair of the instruments can be made much more simple and cheaper. It is desirable that the fastening of details to the bottom plate of the instrument should be done without using any extra mounting element (screws or the like) or tool and also that details, which are fastened to the bottom plate, cannot—after the instrument casing having been fastened to the bottom plate—be unfastened by being acted upon from the outside.

The object desired is rendered possible according to the present invention thereby that the components of the instrument are brought together to groups which belong together from preferably mechanical and electrical point of view, each of said groups forming a mounting unit, which is supported by a stand, a frame or the like, certain components of the instrument, for example transformer, condenser, resistance and so on, thereby being mounted on a mounting plate, which is connected to a frame (preferably a hook-switch frame) arranged in the instrument, to a first mounting unit, the frame being formed with lugs or the like, which are inserted and displaced in openings in the bottom plate of the instrument in such a way that said lugs block said unit against displacement in each direction except one direction lying in the plane of the bottom plate, besides which a second frame, arranged in the instrument for supporting, one or several other components, for example a dial, forms a second mounting unit which is formed with lugs or the like (second lugs), which are inserted in second openings made in the bottom plate of the instrument in such a way that said second unit is fastened to the bottom plate, whereby said second lugs also form stops for the mounting plate in such a way that they block said first unit against displacement in said one direction lying in the plane of the bottom plate.

The different units can preferably consist of a signal unit, an impulse sender unit (dial or key set) and a transmission part unit (comprising hook-switch and the principal components which are included in the transmission circuit except the hand micro telephone). Since the components are brought together to units this way, a structure according to the principle of a "box of bricks" can be applied. The joining together of the separate units to complete instruments is the same and independent of the data it is desired to give the different units. The units can further be pre-adjusted on their respective manufacture places and the bringing together to complete instruments can be done very fast.

At change of spare parts at the subscriber, a great simplicity is obtained; the installer can quickly change a faulty unit without having to do complicated work on site, for example soldering, and then the faulty unit can be repaired centrally.

Figure 6:
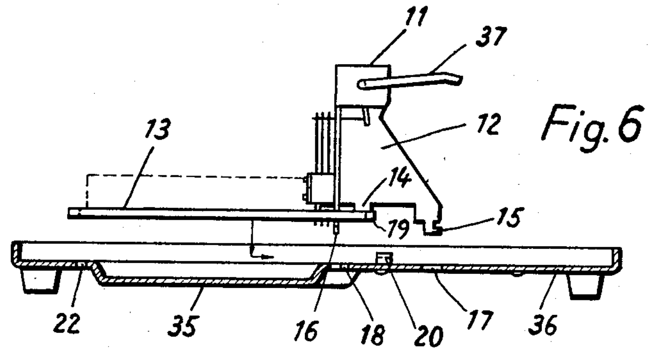
Figure 7:
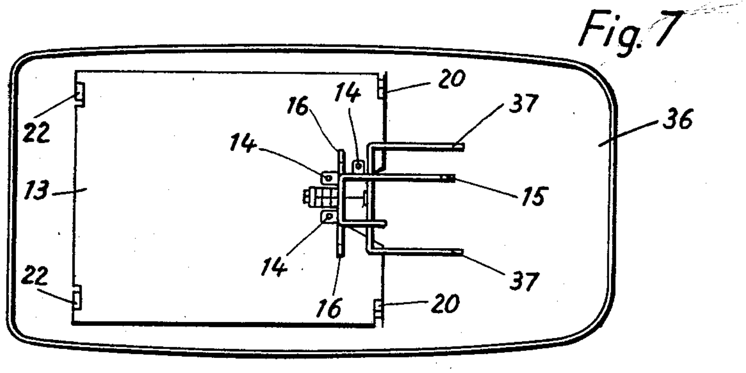
Figure 8:
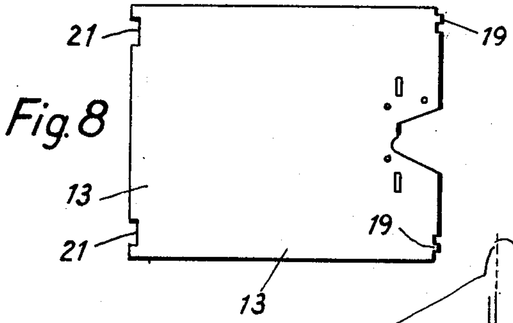
Figure 9:
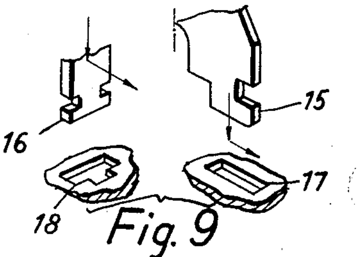
Figure 10:
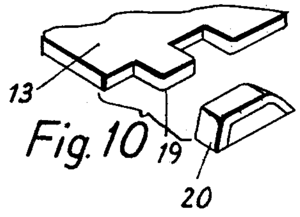
Figure 11:
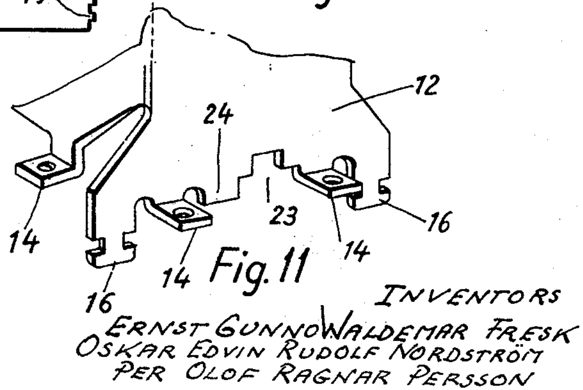
Figure 12:
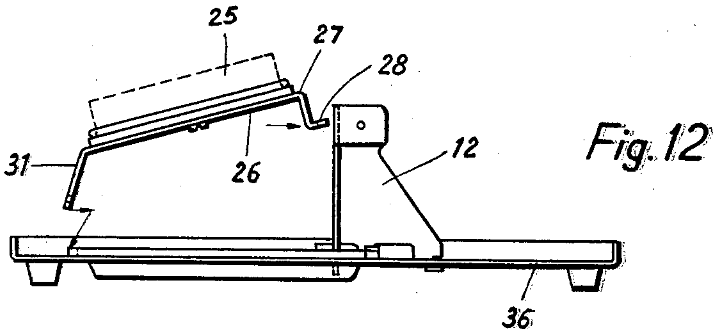
Figure 13:
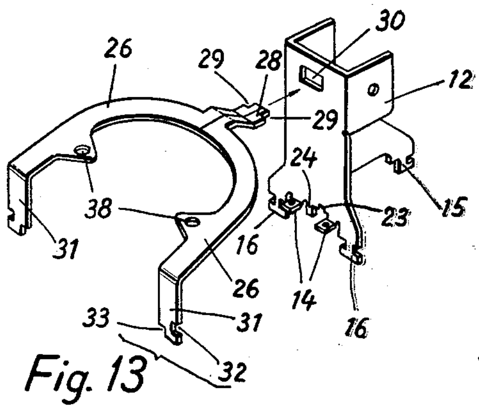
Figure 15:
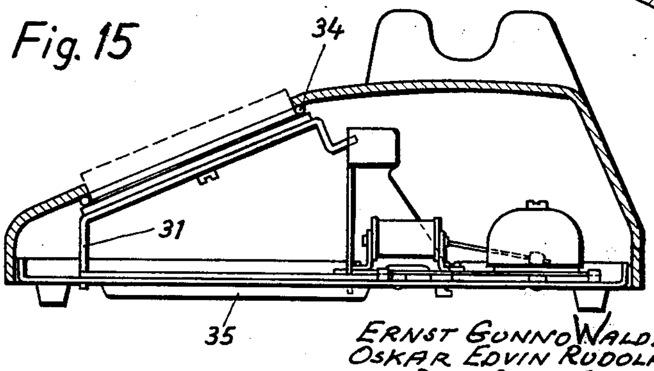
Figure 16:
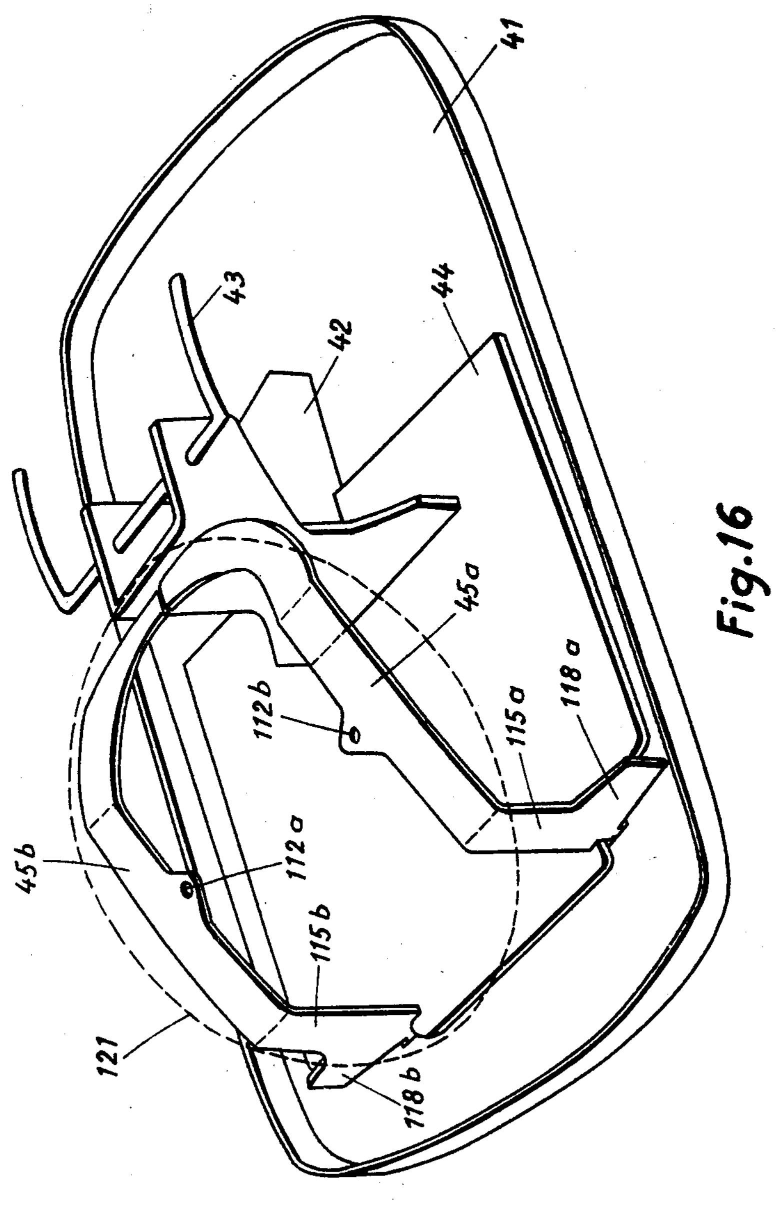
Figure 17:
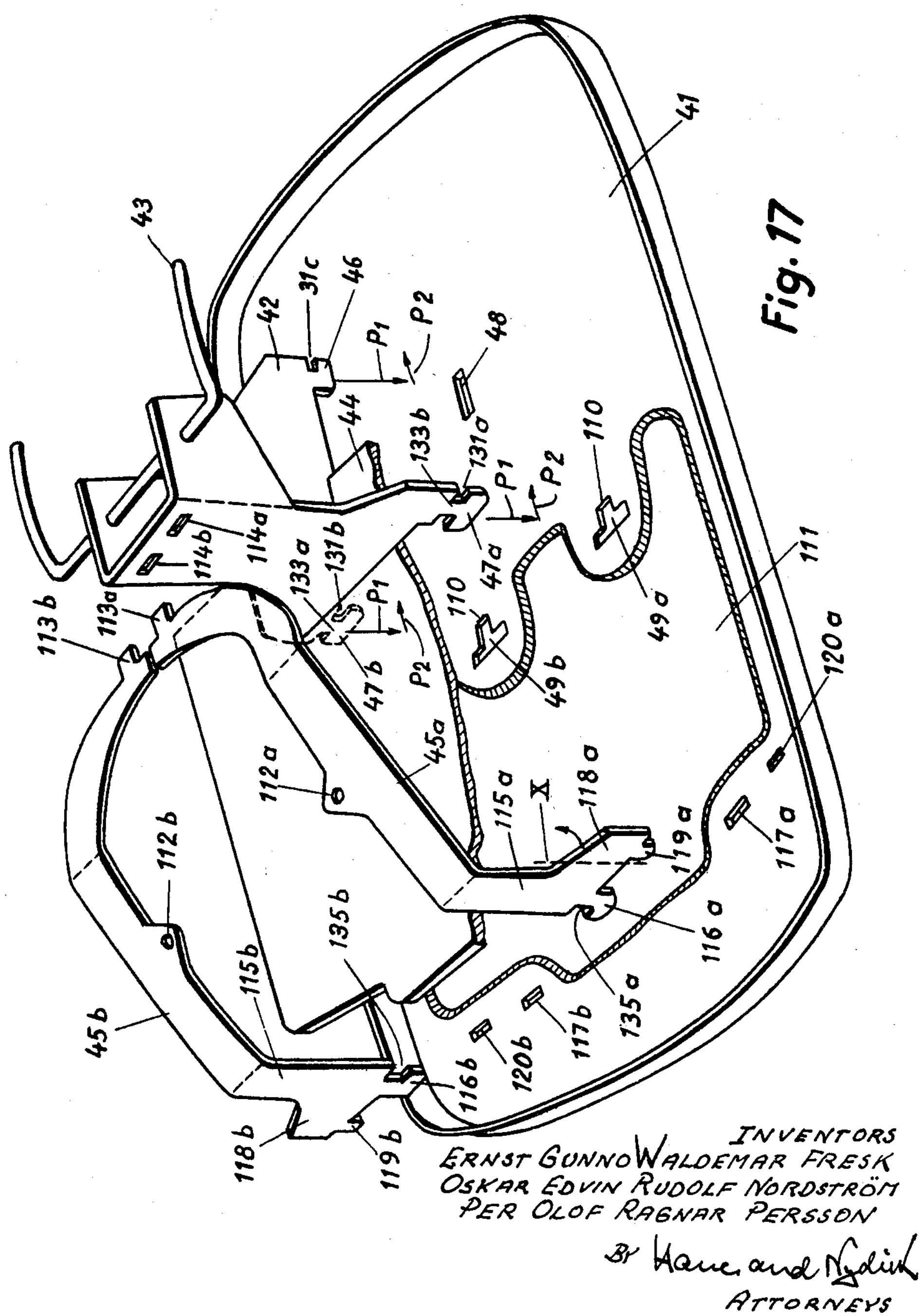
Figure 18:
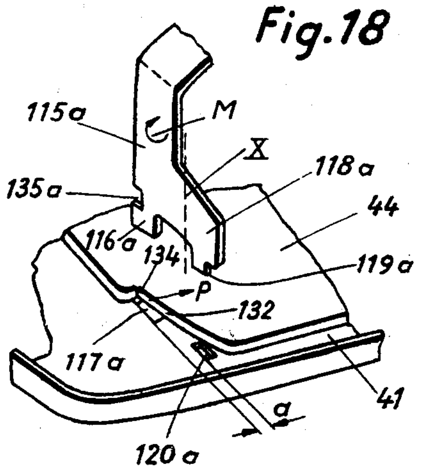
Figure 19:
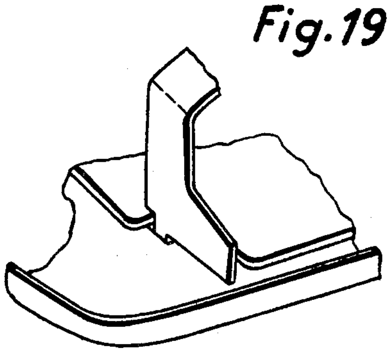
Figure 20:
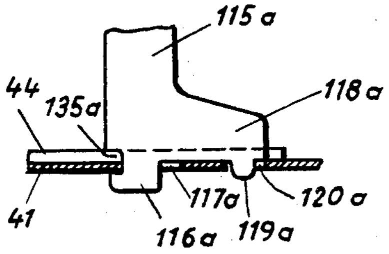
Figure 21:
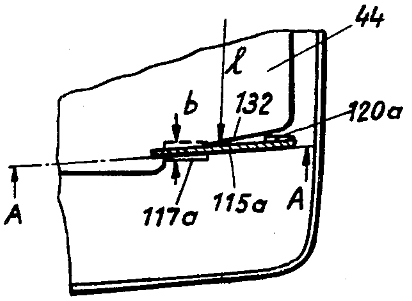
Figure 22:
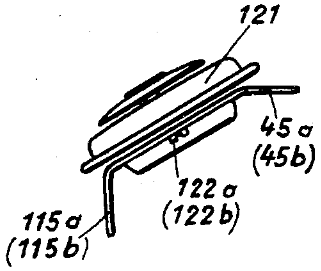
Figure 23:
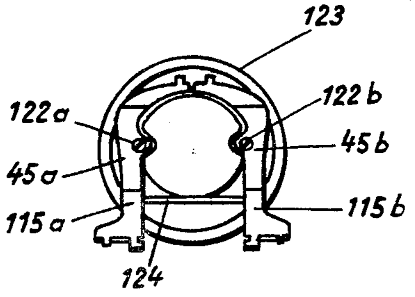

The invention will be further described with reference to the accompanying drawings, which show two embodiments. FIG. 1 is a longitudinal section through the bottom plate of the instrument with the signal unit in mounting position, FIG. 2 shows the same details in top plan view FIG. 3 is a top plan view of the mounting plate for the signal member, FIGS. 4 and 5 show in perspective details of the signal member. FIG. 6 is a longitudinal section through the bottom plate with the transmission unit in mounting position, FIG. 7 shows the same parts in top plan view, FIG. 8 shows a detail in top plan view, FIGS. 9–11 show certain details in perspective. FIG. 12 is a longitudinal section through the bottom plate with the transmission unit mounted and the impulse sender unit in mounting poistion, FIGS. 13 respectively 14 show in perspective the fastening of the impulse sender unit to the hook-switch frame respectively the bottom plate, and FIG. 15 is a longitudinal section through the instrument with applied instrument casing. FIGS. 16–23 show a further embodiment, FIG. 16 showing the instrument seen sideways from above and with the parts mounted on the bottom plate, and FIG. 17 shows in the same way the instrument with the components somewhat lifted from the bottom plate and with a part of a mounting plate broken away. FIG. 18 is a perspective view of one corner of the instrument with a part of a supporting frame somewhat lifted from the bototm plate, and FIG. 19 is the same view with the supporting frame fastened. FIG. 21 shows a corner of the instrument seen from above with the upper part of a frame broken away. FIG. 20 is a section along the line A—A in FIG. 21. FIG. 22 shows in a small scale, seen from the side, a dial mounted on a carrier frame, and FIG. 23 shows the same details seen sideways from below.

The details for the signal member, in the form of an electromagnetic bell 1, are mounted on a mounting plate 2 (FIGS. 1–3). In order to sound-insulate the bell from the bottom plate as much as possible (to prevent clatter from the bell mechanism to be transmitted to the bottom plate) three holes 3 are made in the plate 2, in which holes rubber feet 4 are put, which are terminated with a nab, which when the bell is in correct position, fit into recesses 5 of the bottom plate 36. Hereby is also obtained that the bell comes into correct position on the bottom plate at the mounting. The plate 2 is formed with a nab 6. When the bell is to be mounted on the bottom plate, the plate 2 is inclined in a certain angle and is displaced in the direction of the short arrows in FIG. 1, so that the nab 6 is pushed in under a hook 7 pressed up in the bottom plate (FIG. 5). Then the plate 2 is turned in the direction of the long arrows (FIG. 1) down to the bottom plate 36. The plate 2 is furthermore formed with a head 8 (FIGS. 3 and 4). When the next unit, the transmission part unit, is mounted, the plate 2 is locked against turning upwards by aid of suitable recesses in the plate 12, which supports this unit, and the plate lug 9, by aid of which the electromagnetic winding of the bell is fastened to the plate 2. A longitudinal movement of the plate 2 is blocked by the head 8, and a horizontal movement of the edge 10 by the lug 9. This will be described in detail later on in the description.

The signal member can be of another type of sound producer than a bell, for example a voice-frequency signal arrangement.

The transmission unit 11, FIG. 6, is assumed to comprise a hook-switch 37 with a spring unit, the frame 12 of which is fastened to a printed circuit plate 13, which supports the components necessary for the transmission, which components are not shown in the drawing, i.e. transformer, condenser, resistor and so on. By varying the components of the printed circuit and the wiring, the different diagram variations, which are wanted, can be obtained. The wiring within the printed circuit can be arranged in a known way (foil bonding) and can be fixed in ordinary way through, for example, dip brazing of the plate.

The printed circuit plate 13 can moreover also form terminal block for screw or snap connection of the instrument cords, and for connection of bondings from signal member and impulse sender to the transmission unit.

Before a possible dip brazing of the unit 11, the frame 12 of the hook-switch can be fixed to the printed circuit plate 13 by aid of ears 14 formed in the frame 12, the plate 13 being fastened by aid of tubular rivets. For the fixing of the transmission unit to the bottom plate 36, the frame 12 of the hook-switch has been formed with heads 15 and 16, FIGS. 6, 9 and 13. These heads correspond to holes 17, 18, FIGS. 6 and 9, in the bottom plate 36, so that when the hook frame is moved, according to the arrows in FIGS. 6 and 9, first perpendicularly to the bottom plate and then parallelly with it, the frame is fixed to the bottom plate and can only be pushed back in a direction counter-directed the arrows.

The printed circuit plate 13 has been formed with nabs 19, FIGS. 8–10, which correspond to hooks 20, FIGS. 6 and 10, pressed up in the bottom plate, whereby the nabs automatically are pushed into the hooks when the printed circuit plate 13 follows the mounting movement of the hook-switch 12.

The printed circuit plate 13 is further formed with recesses 21, FIG. 8, which with the transmission unit in complete-mounted position correspond to holes 22 in the bottom plate. When the impulse sender is finally mounted, as will be described later on, the transmission unit is locked in a pushed forward, complete-mounted position against being pushed backwards, and the printed circuit plate 13 is at the same time locked against lifting.

A lever is indicated 37 and is acted upon by plungers in the cradle at the replacement of the micro telephone, in a way known per se, for actuation of the spring set.

With the transmission unit in pushed forward, mounted position and the signal member in its complete-mounted position, the signal member is as mentioned locked by the lug 9 with the edge 10 of the signal member, see FIG. 4, fitting into a recess 23 in the hook frame 12, FIG. 11, and further by the head 8, FIG. 4, of the frame 2 of the signal member bearing against the nab 24 formed in the wall of the hook frame, FIG. 11, which in perspective shows the lower part of the hook frame 12 seen from the outside.

The impulse sender unit consists of the impulse sender 25, FIG. 12, which is fastened to a mounting plate in the form of a clamp with shanks 26 provided with fastening holes 38. The clamp is in its middle portion provided with a nab 28 with stop heads 29. In the hook frame 12, FIG. 13, a hole 30 is made and is so dimensioned that the nab 28 can be pushed into this hole so far that the heads 29 bear against the plane of the hook frame. The free ends 31 of the fastening shanks 26, FIGS. 13 and 14, have been formed with grooves 32 and heads 33, FIG. 14, formed so that when their resilient ends 31 are bent in towards each other and pushed down into holes 22 in the bottom plate 36 and then released according to the diagram of movement shown by the arrows in FIG. 14 (the figure shows only the movement of one end), these grooves 32 and heads 33 will correspond to recesses 21 in the printed circuit plate 13, FIGS. 8 and 14, and holes 22 in the bottom plate (FIGS. 7 and 14).

Figure 14:
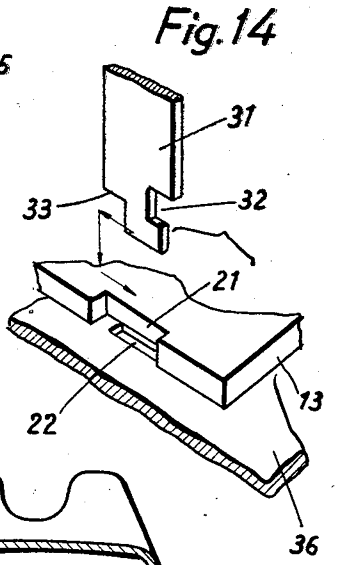

Hereby the mounting plate 26, 31 of the impulse sender is locked to the bottom plate by that the groove 32 in the shank 31 grips as well the bottom plate 36 as the printed circuit plate 13 and the head 33 bears against the bottom plate, FIG. 14. Simultaneously the printed circuit plate 13 is hereby locked against as well pushing as lifting into its correct mounting position, as previously mentioned. The arrows in FIGS. 12 and 14 show the diagram of movement at the mounting of the impulse sender.

When the instrument casing is finally applied, FIG. 15 (fastening arrangement for the casing is not shown here), and then supposed to be fixed relatively the bottom plate, the mounted instrument units cannot be unfastened from the outside. The signal member and the transmission unit are completely locked as long as the legs 31 of the fastening shanks of the impulse sender protrude through the bottom plate 36. Even if it is possible to press these two legs towards each other from the underneath of the bottom plate and thereby loose the grip, the casing will, however, prevent the legs 31 from being pushed up through the holes 22 in the bottom plate 36 by its resting against the impulse sender or against its packing 34.

The invention can also be applied at an instrument without a signal member by that the transmission unit and impulse sender unit also in this case are held to the bottom plate 36.

FIGS. 6, 12 and 15 show a recess 35 pressed down in the bottom plate. This recess shall protect and insulate the solderings protruding from underneath the printed circuit plate 13.

At the now described embodiment the displacement of the mounting plate is prevented in one direction by that a limiting edge of the mounting plate, going mainly perpendicularly to the displacement direction, bears against one or several lugs formed on the second frame. If the manufacturing tolerances are small and the mounting plate dimension-stable, it will bear free from play between two supports. However, if the tolerances are relatively great and the mounting plate is not dimension-stable but can change dimensions for example through moisture absorption respectively drying, this will cause that there is no security that the mounting plate will rest against said lugs after the mounting. If the mounting plate with one edge rests some tenth of a millimeter from the support lugs, the cradle frame with the mounting plate can be displaced a corresponding distance in the plane of the plate, and these two parts will have too much play when shocked, which is unsuitable, inter alia from stability point of view. In the embodiment shown in FIGS. 16–23 this disadtage is eliminated.

The hook-switch frame 42 (FIGS. 16, 17) has a cradle 43 intended to be acted upon by cradle plungers, which are not shown, at the lifting and replacing of the hand microtelephone. The cradle is assumed to actuate a spring set mounted on the frame in a usual way, which spring set controls the switching of the instrument between voice and signal position. A mounting plate 44 is in a suitable way fastened to the frame 42, said mounting plate is preferably made out of insulating material and intended to support components necessary for the transmission circuit, for example transformer, resistance, condensers and so on and terminals for example dial connections and so on. Soldering tags for the cradle spring set and the components mounted on the mounting plate 44 can be brought through holes in the plate 44 and connected with each other, for example through a printed circuit. These details are not shown here and neither is shown how the frame is fastened to the plate 44. For example, the plate 44 can be fastened to the frame 42 in a way shown in the previously described embodiment by aid of tubular rivets, which are riveted to ears formed in the frame. The frame and the plate form thereby a stiff unit (transmission unit). FIGS. 16 and 17 show also a supporting frame 45*a*, 45*b*, which is formed in two parts and intended to support the dial 121 of the instrument, which dial is indicated by lines of short dashes in FIG. 16. The support frame forms a clamp with legs 115*a*, 115*b* being bent at the bottom, which legs are formed with lugs 116*a*, 116*b* and 119*a*, 119*b* in FIG. 17 and recesses 135*a*, 135*b*, which lugs are pushed down into openings 117*a*, 117*b* and 120*a*, 120*b* in the bottom plate 41. The supporting frame 45*a*, 45*b* is also provided with lugs 113*a*, 113*b*, which can be inserted in holes 114*a*, 114*b* in the hook-switch frame 2. Possibly the lugs 113*a* and *b* can be formed to hooks, which are hooked in the openings 114*a* and *b*.

At mounting of the parts, the frame 42 with the mounting plate 44 is first moved in the direction of the arrow P1 in FIG. 17 so that the lugs 46, 47*a* and 47*b* are pushed down into the holes 48, 49*a* and 49*b*, whereafter the frame 42 is displaced in the direction of the arrow P2 so that the recesses 131*a–c* grip the edge of the bottom plate 41 and so the tapered part 133*a* and *b* of the lugs 131*a* and 131*b* strikes against the edge 110 of the holes 49*a*, 49*b*. The hole 48 can be sufficiently long in order not to restrict the movement. The frame 42 and the mounting plate 44 take now the position shown in FIG. 16. The figure shows also that there is a recess 111 depressed under the greater part of the mounting plate in the bottom plate. This recess is intended to give room for a possible wiring under the mounting plate or for giving assuring air space and therewith insulation for a printed circuit with foil and solderings on the underneath of the mounting plate.

The supporting frame 45*a*, 45*b* supports the dial, which rests against the upper part of the supporting frame and is fastened by aid of screws 122*a*, 122*b* screwed from below through the holes 112*a*, 112*b*, see FIGS. 22 and 23. The supporting frame 45*a*, 45*b* with the dial is now mounted on the bottom plate 41 in the following way. The lugs 113*a*, 113*b* are pushed into the holes 114*a*, 114*b* of the frame 42, and then the legs 115*a*, 115*b* are somewhat stretched away from each other (the distance between the lugs 116*a* and 116*b* in rest position is a little smaller than the distance between the holes 117*a*, 117*b*), so that the lugs 116*a*, 116*b* can be pushed down into the hole 117*a*, 117*b* of the bottom plate 41. In doing so the fact that the legs 45*a* and *b* are formed with further lugs 119*a* and *b* is for the present disregarded. When the legs 115*a*, 115*b* are released and resiliently restored in the direction towards each other, the grooves 135*a*, 135*b* will grip the plate edge of the holes 117*a*, 117*b* and also grip the mounting plate 44 (see also FIG. 20). The last described mounting is analogous with the one stated in the first embodiment. The supporting frame 45*a*, 45*b* formed to a clamp has according to the invention a further function. The legs 115*a*, 115*b* are formed with side portions 118*a*, 118*b*, which are provided with lugs 119*a*, 119*b*, for which holes 120*a*, 120*b* are made in the plate 41. These holes are, however, displaced in the longitudinal direction of the plate 41, so that when the lugs 116*a*, 116*b* are pushed down into the holes 117*a*, 117*b*, the lugs 119*a*, 119*b* cannot at once be pushed down into the holes 120*a*, 120*b*. The lugs 119*a* and *b* are somewhat shorter (in the direction perpendicular to the plane of the plate) than the lugs 116*a* and *b*, so that the lugs 116*a* and *b* can be pushed down somewhat into their holes without being prevented by the lugs 119*a* and *b*. The position of the holes 120*a* and *b* appears from FIG. 18. The rear edges (counted from the cradle-switch frame 42) of the holes 117*a*, 120*a* are displaced a short distance "*a*," and the width "*b*" (FIG. 21 of the hole 117*a* is bigger than the plate thickness of the lug 116*a*, so that the latter can move somewhat in the hole. In order to enable the insertion of the lugs 119*a*, 119*b* into the holes 120*a*, 120*b*, after the lugs 116*a*, 116*b* partly being brought down into their holes, the side part 118*a* must first be turned a little around the axis X of short dashes in FIG. 17 in the direction of the arrow. The torsion-tension in each leg, for example 115*a*, gives, when both lugs 116*a* and 119*b* are inserted in their holes, a remaining torque M, which causes the leg 115*a* respectively 115*b* to press against the edge 132 (FIG. 18) of the mounting plate 44 with a force F determined by the dimensioning of the details. The mounting plate can here have such an outline that this will happen near a cut 134 formed in the plate. As appears from FIG. 21 the width "*b*" of the hole 117*a* is so big, that the hole goes somewhat under the bottom plate. Even if the length "1" of the plate 44 varies (FIG. 21), the leg 115*a* will resiliently press against the plate edge 132 and thereby enable a mounting of the cradle frame 42 with plate 44 free from play in the longitudinal direction of the instrument. It is evident that with normal methods of manufacturing the tolerances for cutting out the edges and holes of the mounting plate and the holes in the bottom plate are such that a certain play in the longitudinal direction of the plate 44 must be allowed if the resilient holding according to the invention is not applied. If to this the circumstance is added that the insulating material, of which the plate 44 consists, for example paper laminate, expands at moisture absorption (if the length of the plate is assumed circa 100 millimeters this expansion would be 0.3 millimeter) a corresponding play must be allowed in the longitudinal direction of the plate. The now described resilient bearing is obtained without having to use any extra details, only by using a supporting frame 45*a*, 45*b* necessary per se for supporting the dial, which supporting frame is formed with the side parts 118*a*, 118*b*. FIG. 21 shows, seen from above, a corner of the instrument with the upper part of the leg 115*a* cut away. The figure shows that the side part 118*a* is turned as indicated above. In FIG. 20, which is a section along the line A—A in FIG. 21, the dimensions of the holes appear which are necessary in order to enable the mounting of the leg 115*a*. The cuts (FIG. 21) arising between the lugs 116*a* and 119*a* and the edges of the holes 117*a*, 120*a* need not be bigger (depending on play owing to tolerances and contraction of the plate 44) than the requirement of an insect-proof mounting is met (circa 0.3–0.5 millimeter opening may as a rule be allowed). FIGS. 22 and 23 show how the dial 121 is fastened to the supporting frame 45*a*, 45*b* by aid of screws 122*a* and 122*b*. In order to make turning towards each other of the two halves 45*a*, 45*b* of the supporting frame impossible by damage before the mounting, the covering plate of the dial (generally made of plastic material) can be formed with a stop rib 124, which holds the legs 115*a*, 115*b* in correct position, i.e. in the position they were before being bent out from each other.

When the supporting frame 45*a*, 45*b*, with the dial 121 fastened to it, is mounted at the bottom plate 41 respectively at the cradle frame 42, a casing, which is not shown, is put over the instrument and is fastened to the bottom plate (for example as shown in the embodiment shown in FIG. 15). The edge of the opening in the casing for the dial presses at this against the annular formed edge of the dial, so that the supporting frame cannot be pushed up from below.

Only two mounting units, the transmission unit 42, 44 and the unit, which comprises the dial and is supported by the frame 45*a*, 45*b*, are shown in the now described embodiment. Any signal member unit is not shown but can be arranged on the bottom plate in front of the transmission unit in a way shown in the previously described embodiment. The bottom plate 41 ought then in front to be formed with a hook (in FIG. 1 indicated 7) pressed up in the plate for fastening of one end of the signal member unit. The second end of the last-mentioned unit is then held against the bottom plate of the cradle frame in such a way as shown in connection with the first embodiment. Recesses (5 in FIG. 1) can also be made in the bottom plate for guiding.

We claim:

1. A telephone instrument comprising a signal assembly including signaling components, a transmission assembly including transmitting components and a pulse-sending assembly including pulse-sending components, a support structure for each of said assemblies, each of said support structures mounting the components of the respective assembly, a base plate for mounting thereupon said support structures, a first one of said structures and the base having engageable locking means for keying said structure to the base, said first structure being releasable upon displacement in a predetermined direction with reference to the base, a second one of said structures, the base, and the first structure having engageable locking means for keying the second structure to the base and to the first structure to lock the first structure in its position, said second structure being releasable from the base and the first structure upon displacement in a predetermined direction with reference to the base, and the third one of said structures having displaceable locking means engageable with the base and the second structure for keying the third structure to the base and blocking displacement of the second structure in said predetermined direction, whereby keying of said third structure locks are three structures to the base, said third structure being releasable from the base by displacement of the locking means of the third structure with reference to the base.

2. A telephone instrument according to claim 1 wherein said locking means are slot-key means.

3. A telephone instrument according to claim 1, wherein said second support structure and said third support structure have coacting locking means keying said two structures to each other upon keying the third structure to the base.

4. A telephone instrument according to claim 1, wherein at least one of said support structures includes flexible portions, said flexible portions mounting the respective locking means, whereby upon insertion of the locking means of the support structure in the respective locking means on the base, the locking means of the respective support structure are tensioned.

5. A telephone instrument according to claim 1, wherein at least one of said support structures comprises a pair of locking means coacting with a pair of locking means on the base, said locking means on the respective support structure being mounted resiliently with reference to each other and biased out of registry with the corresponding locking means on the base, whereby upon engagement of said locking means with each other the locking means of the respective support structure are tensioned.

6. A telephone instrument according to claim 1 and comprising a casing attachable to the base to cover said support structures and the components mounted thereon, said casing when attached to the base preventing release of the third structure.

7. A telephone instrument according to claim 1 wherein said second support structure comprises a mounting plate disposed parallel to the plane of the base plate, said mounting plate having an edge portion abutting against said third support structure, and wherein said third support structure and said base plate comprise locking means engaged with each other, said locking means on the third support structure being flexible and biased out of registry with said locking means on the base plate whereby said locking means on the third support structure engage said locking means on the base plate under tension to cause pressure abutment between the third support structure and said edge portion of the mounting plate.

8. A telephone instrument according to claim 1 wherein said second support structure comprises a mounting plate disposed parallel to the plane of the base plate, the locking means of the third support structure including a pair of flexible legs and the mounting plate including an edge portion in abutment with said legs, said legs being biased in a direction normal to the direction of displacement of said second support structure.

9. A telephone instrument comprising, in combination, several subassemblies of electrical circuit components of said instrument, a base plate, a support structure for each of said subassemblies, each of said support structures and said base plate including locking means releasably engaged with each other for securing the support structures to each other and to the base plate, the locking means on one of said support structures being flexible and in tension engagement with the respective locking means on the base plate, said one support structure being arranged in reference to the two other support structures so as to block release of said other support structures prior to a release of said one support structure.

References Cited in the file of this patent

UNITED STATES PATENTS

| | | |
|---|---|---|
| 1,179,940 | Lamb et al. | Apr. 18, 1916 |
| 1,355,213 | Chipperfield | Oct. 12, 1920 |
| 2,611,460 | Nash | Sept. 23, 1952 |
| 2,812,387 | Safarik | Nov. 5, 1957 |
| 2,862,063 | Wood | Nov. 25, 1958 |